May 21, 1935.     M. STROSK     2,002,420
COFFEE PRESERVER
Filed May 26, 1934
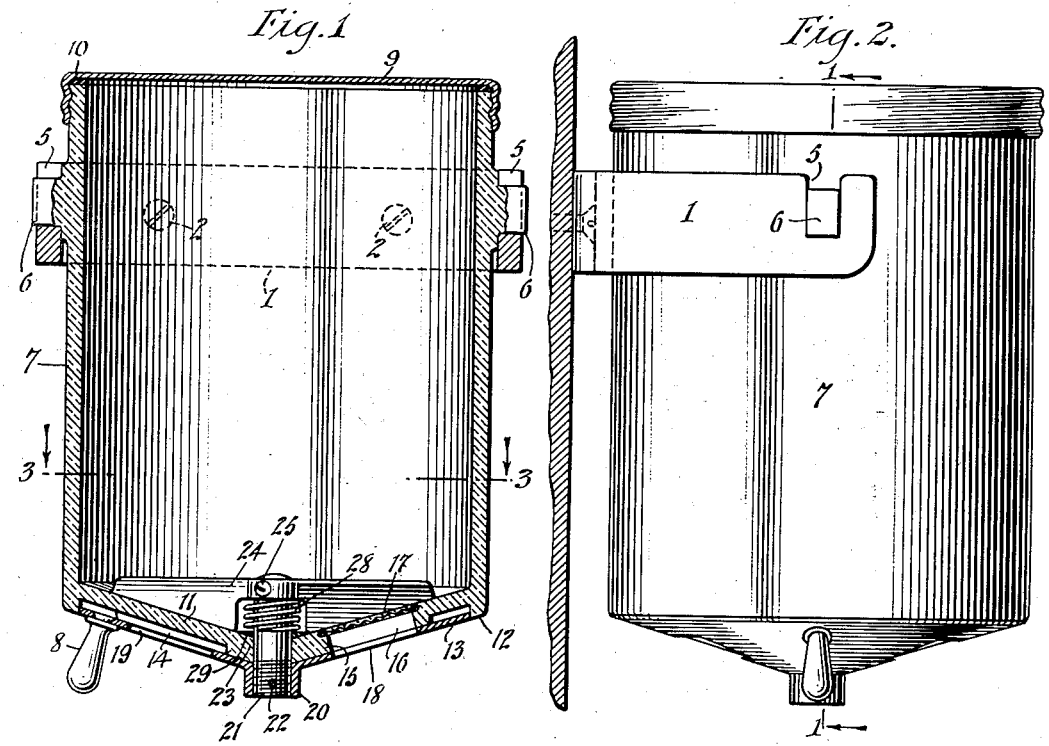
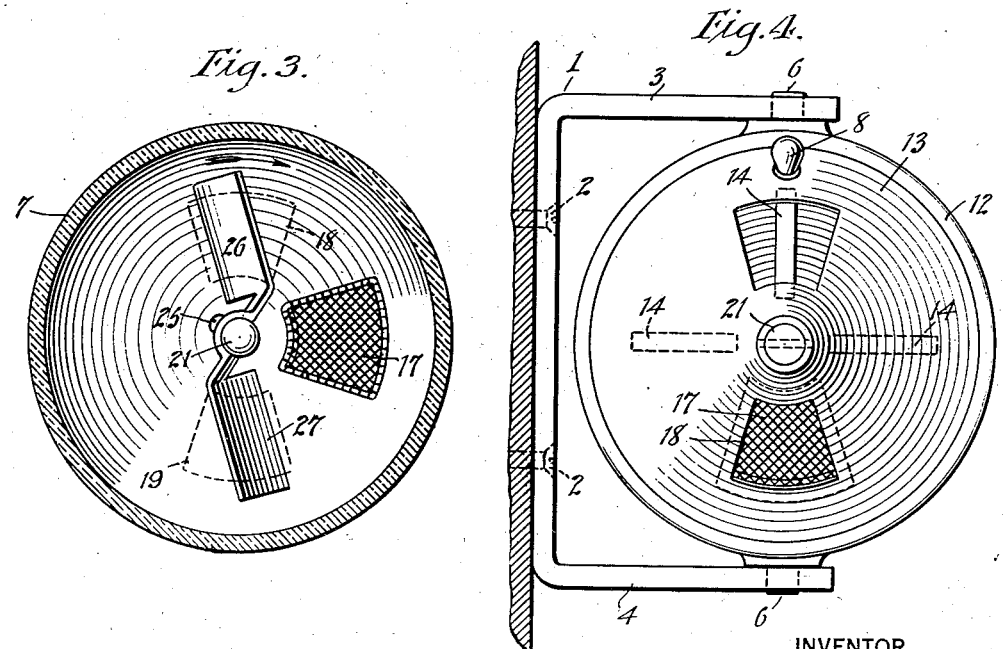
WITNESSES
INVENTOR
Mark Strosk
BY
ATTORNEY Patented May 21, 1935

2,002,420

UNITED STATES PATENT OFFICE 2,002,420

COFFEE PRESERVER

Mark Strosk, Berkeley, Calif.

Application May 26, 1934, Serial No. 727,795

5 Claims. (Cl. 221—66)

This invention relates to a coffee preserver, and has for an object to provide a construction wherein the coffee or other product may be contained and vended from time to time, the structure being such that the aroma of the coffee will remain substantially constant until the device has been emptied.

Another object of the present invention is to provide a container which will act as a vending container for coffee, sugar or other material, wherein the contents of the container will always remain in its original state while in the container, though being continually in position to be vended in desired quantities.

A further object, more specifically, is to provide a coffee preserver or container formed with a vending structure at the bottom arranged to vend from time to time desired quantities without admitting any air into the container.

In the accompanying drawing—

Figure 1 is a longitudinal vertical sectional view through Figure 2, the same being on the line 1—1;

Figure 2 is a side view of a coffee preserver disclosing an embodiment of the invention;

Figure 3 is a transverse sectional view through Fig. 1 approximately on the line 3—3;

Figure 4 is a bottom plan view of the structure shown in Fig. 2.

Referring to the accompanying drawing by numeral, 1 indicates a bracket which is substantially U-shaped as shown in Fig. 2, said bracket being held in place on a wall or other place by suitable screws 2, and provided with arms 3 and 4. Each of the arms is provided with a notch 5 so that the trunnions 6 of the container 7 may fit therein. It will be observed that the notches 5 are rectangular and that the trunnions 7 are similarly shaped so that all parts are in the position shown in Figs. 1 and 2 and the container cannot rotate but is held supported in a proper manner for the manipulation of the handle 8 and associated parts whenever desired.

The container 7 may be made from metal, glass or other material, but as shown in the drawing it is made from glass and the trunnions 7 are formed integral with the body of the container. At the upper end the container is provided with exterior threads for receiving the threaded cap 9 which may be of metal or other material, and which is screwed down tightly so as to press against the gasket 10, whereby the container is airtight at this point. At the lower end the container is formed with a bottom 11 which tapers and which is provided with a central aperture. The bottom 11 is spaced upwardly from the bottom edge of the side wall 12 so that the rotating closure plate 13 may be above the lower end of the wall 12 or flush therewith, as illustrated in Fig. 1. The closure plate 13 is of the same general shape as the bottom 11 but is spaced therefrom by a number of lugs 14 which act as bearing members, and by the raised bead 15 surrounding the discharge opening 16. This discharge opening may be free or may be provided with wire mesh screen 17. The closure plate 13 is provided with apertures 18 and 19 which are brought into registry with the opening or aperture 16. In the drawing there have been shown two openings in the closure plate and only one in the bottom 11, but if desired a greater number of openings may be provided in the bottom and also a greater or lesser number of openings in the closure plate without departing from the spirit of the invention. Where the device is made from glass the bead 15 and the outer surface of the lugs 14 are ground to make airtight joints at the bottom end of the container. If the device is made from metal these various surfaces are smoothed in any desired manner so as to provide a snug fit.

The plate 13 is also provided with a tubular central depending member 20 which accommodates the pin 21. As shown in the drawing, pin 21 is screwed into the tubular extension 20 and the pin 22 is applied which prevents any unscrewing. This pin extends through the aperture 23 in the bottom 11 and upwardly a short distance to the interior of the container. A double-bladed vending propeller 24 is secured to the upper end of pin 21 by any suitable means as, for instance, by the screw 25. This propeller has the blades 26 and 27 scraping on the bottom 11 and, consequently, forcing the coffee or other material into and through the opening 16 as the respective propeller blades pass the opening. A spring 28 surrounds pin 21 and acts at one end on the propeller 24 and at the other end on a suitable washer 29 resting on the bottom 11, said spring functioning to hold the closure plate 13 against the bead 15 and the lugs 14. Any desired tension may be provided by the spring, but preferably it is only tight enough to secure airtight connection while allowing the handle 8 to be operated by any one at any time.

When the device is to be used the cover or cap 9 is removed and the ground coffee or other material placed in the container 7. The cap 9 is then screwed down tightly. When it is desired to procure a desired quantity of coffee, the handle 8 is grasped and moved for rotating the cover plate 13. When the opening 18 passes the opening 16 a certain quantity of coffee is discharged, and when aperture 19 passes opening 16 another quantity is discharged. The quantity discharged on each passing of an opening will vary with the speed of the plate 13. As shown in the drawing, the parts are proportioned so that a spoonful is discharged in case the plate 13 is being moved rather slowly. If it is being moved comparatively fast half a spoonful or less is discharged each time of registering of the respective openings.

The idea in forming the parts in this manner is to provide means whereby the coffee may be removed from the container readily and at the same time prevent entrance of air so that the aroma and general original condition of the coffee remains static. In this way ground coffee may be preserved for a comparatively long time and yet be ready to be vended at any time.

It will be noted that by the tight sliding connection of the parts the container is airtight and remains airtight even during the withdrawal of the coffee, as there is a supply of coffee always at the opening, and this with the wire mesh presents a seal against the entrance of air, though the propellers may force coffee therethrough against the atmospheric pressure.

I claim:

1. A coffee preserver of the character described comprising a container having at the bottom an aperture, a closure plate arranged beneath said bottom but in engagement therewith, said closure plate having an aperture therein adapted to register with the aperture in said bottom, rotatable means connected with the closure plate and positioned within the container for forcing some of the contents of the container from said aperture when in registry and resilient means acting on said rotatable means for pulling said closure plate towards the exterior surface of said bottom.

2. A device of the character described comprising a container of vitreous material having a tapering bottom with an aperture in one part thereof, a metallic lid screwed onto the container at the top, a gasket for producing an airtight connection between the metallic lid and the container, said bottom having an upstanding bead exteriorly around said aperture, and a plurality of raised portions scattered over the exterior of the bottom, said raised portions being of the same height as said bead, an apertured closure plate formed to fit slidingly but airtight against said bead and said raised portions, resilient means for maintaining said plate pressing against said bead and raised portions, and a handle for causing manual operation of said plate whereby the aperture therein may be moved into and out of registry with the aperture in said bottom.

3. A device of the character described comprising a container formed with a tapering bottom having an aperture in the center and a discharge opening between the center and the periphery, a pin extending through said aperture, a propeller having a plurality of blades secured to said pin, the propeller arranged interiorly of the container and positioned to force some of the contents of the container through said opening as the blades pass the opening, a cover plate of substantially the same shape as said bottom fitting flatwise against the bottom for maintaining said opening closed, said plate having an aperture adapted to be brought into registry with said opening when the material within the container is to be discharged therefrom, said cover plate being rigidly secured to said pin, and a spring acting on said bottom and acting on said propeller for transmitting strain to said pin whereby said plate is held tightly against said bottom.

4. A device of the character described including a container having an aperture in the center and an opening between the center and the periphery, a cover plate fitting against said bottom exteriorly thereof and normally closing said opening, said cover plate having an aperture adapted to be brought into registry with said opening, a pin secured to said cover plate and extending through said aperture in said bottom, and means including a spring for giving said pin a tendency to move into said container, whereby said cover plate is caused to fit airtight against said bottom.

5. A device of the character described comprising a container having a bottom provided with a centrally positioned aperture and a discharge opening at one side of the aperture, a cover plate fitting against the exterior face of said bottom and normally closing said opening, a rotatable feeding member positioned interiorly of said container means connected to said cover plate and said feeding member for rotatably mounting said cover plate and said feeding member, and a spring acting on said feeding member and said container for continually pressing said cover plate against the exterior of said bottom, said cover plate having an aperture adapted to be brought in line with said opening, and a handle connected with said cover plate whereby the handle may be grasped and the cover plate rotated as often as necessary to bring said opening and said aperture in the cover plate in registry as many times as desired.

MARK STROSK.